United States Patent Office 3,295,413
Patented Jan. 3, 1967

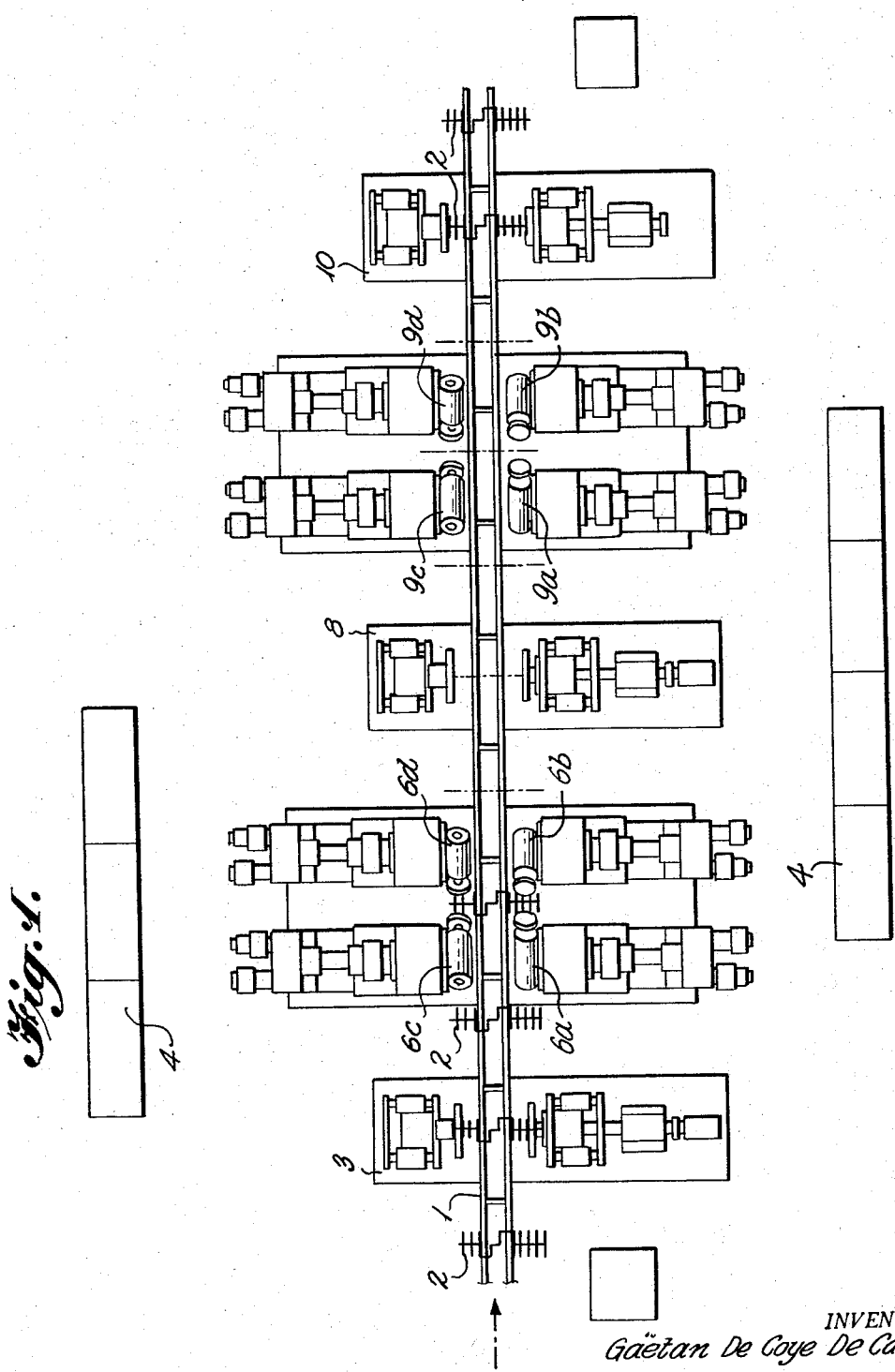

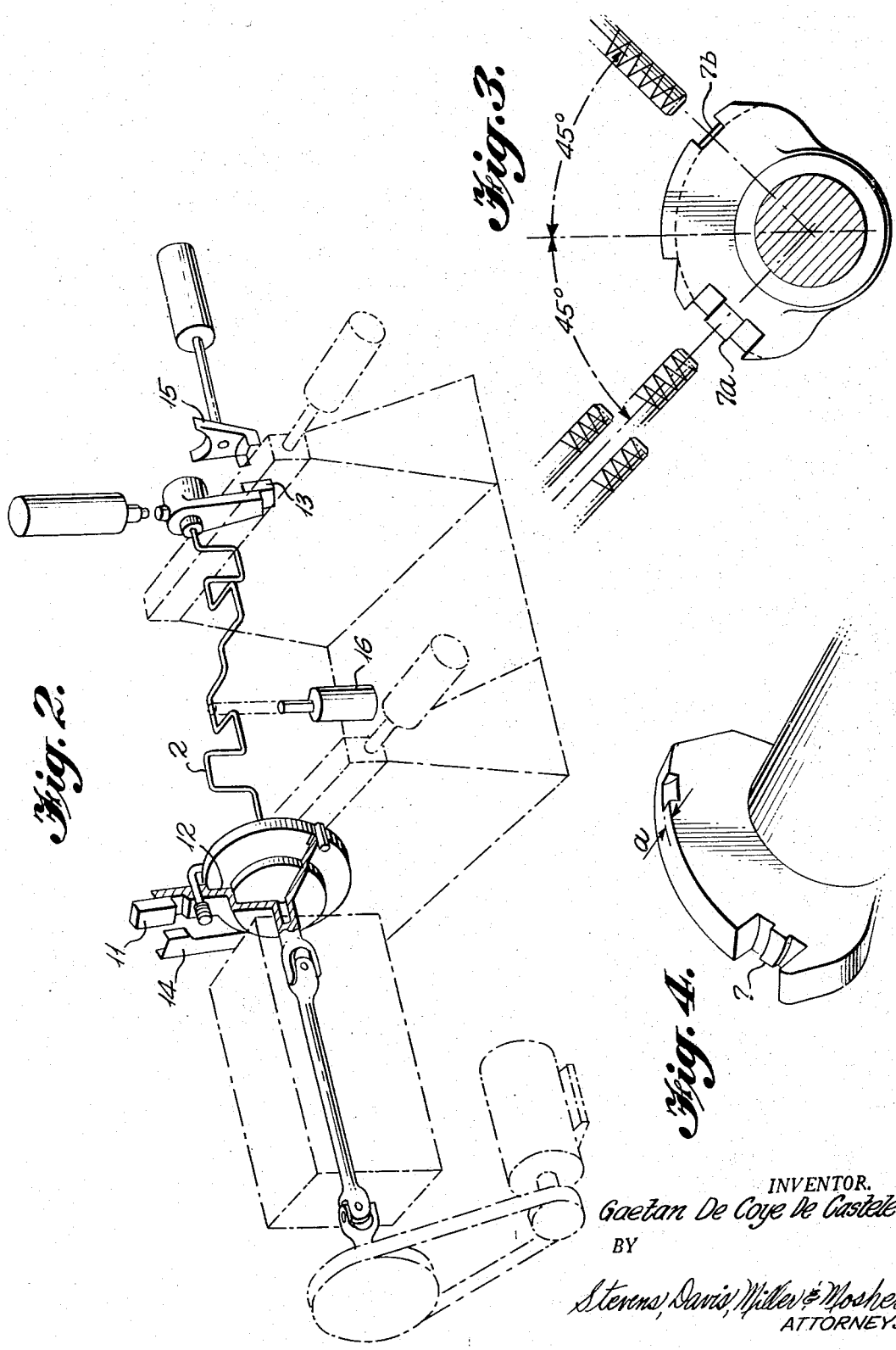

3,295,413
INSTALLATION FOR BALANCING ENGINE CRANKSHAFTS
Gaëtan de Coye de Castelet, Billancourt, France, assignor to Regie Nationale des Usines Renault, Billancourt, France
Filed Mar. 29, 1965, Ser. No. 443,507
Claims priority, application France, Apr. 2, 1964, 969,519, Patent 1,398,894
2 Claims. (Cl. 90—11)

As is well known, engine crankshafts are castings or forgings which, after the bearings and crankpins have been machined, are heavily out of balance to an extent greater than the want of balance regarded as tolerable (i.e. approximately 20 g./cm.), due to the unmachined portions. It is therefore necessary to effect a dynamic balancing.

It has already been proposed to carry out the dynamic balancing operations entirely automatically, these operations being determining the position and magnitude of the want of balance, calculating the corrections, a monitored corrective machining and a final checking of the result.

To that end, the crankshafts are first placed on measurement machines comprising oscillating cradles supported on blades. Vibration sensors transmit the measurements registered in the planes of the bearings to computing machines which resolve the want-of-balance vectors into their components along the planes containing the counterweights selected for machining and which determine the quantities of material to be removed and finally ensure controlled shifting of the tools mounted on the balancing machine in order that the quantities of material determined in this way can be removed. A measuring device identical to the input device checks the residual want of balance, authorizes the discharge of crankshafts meeting the permissible tolerances and discards the crankshafts which fall outside the want-of-balance tolerance limits, either placing them among the rejects or directing them into a fresh correction cycle.

In most of the machines used heretofore, the crankshafts were moved longitudinally of themselves along a transfer path which ran past the measurement equipment, followed by the automatic machining heads and, lastly, the checking balances, these automatic heads being so positioned as to operate by removing material from the counterweights selected for effecting the correction.

However, the position of the counterweight machining tools and the fact that the crankshaft is placed longitudinally along the transfer path have resulted in a balancing installation of considerable bulk.

In accordance with the present invention, the balancing installation is so devised that the crankshafts are translated transversely of their longitudinal axes. Thus, they are set crosswise on the transfer device, as a result of which the distance between consecutive operating stations is at a minimum, thereby greatly reducing the total length of the machine. Correction is effected by milling or drilling only the terminal counterweights, in two planes at right angles to each other. Since the direction of tool travel is therefore parallel to the axis of the part, such a disposition permits of orientating the machines into parallelism with said axis and hence transversely in relation to the main line of travel of the parts.

This ensures an unusually compact installation.

Another feature of the invention permits of satisfying the trend towards ever more perfect balancing, particularly in the case of large engines such as eight-cylinder engines.

In a piston engine, the crankshaft is not the only cause for the want of balance.

A crankshaft operates in pivotal connection to the connecting rods—themselves pivotally connected to the pistons—whereas the pistons, and consequently the small ends, are possessed only of a linear reciprocating motion, while the crankpins and the big-end bearing shells describe a substantially uniform and continuous circular motion. As a result, the connecting rod is possessed of an elementary instantaneous rotation about the instantaneous rotation axis, the latter being determined by the intersection of the planes normal to the paths followed by the centre of the small end and the centre of the big end respectively. This rotation can be regarded as resulting from a reciprocating translation identical to that of the piston and from a continuous rotation at constant speed.

The dynamic balancing of the whole compound can be dealt with by imagining a want of balance specific to the compound and fictitiously represented by two weights placed in determinate positions on the drive plate and on the opposite end of the crankshaft, on the measuring machine.

Such a device is used here in the manner disclosed hereinafter.

The invention will now be more particularly described with reference to the accompanying non-limitative exemplary drawing, in which:

FIGURE 1 schematically illustrates a crankshaft balancing installation;

FIGURE 2 is a schematic perspective view of the crankshaft placed on the cradle of one of the measuring devices;

FIGURE 3 is a front elevation view of a counterweight, showing the manner of machining the same, and FIGURE 4 is a perspective view of the counterweight of FIGURE 3.

Referring first to FIGURE 1, it will be seen that the installation shown thereon comprises a transfer path 1 on which the crankshafts 2 are positioned transversely as schematically represented, and along which they are transferred by appropriate means, with halts taking place at each work station.

Each crankshaft is first submitted to a want-of-balance measuring machine 3 shown in perspective in FIGURE 2. This machine is equipped with plain bearings level with the terminal journals of the crankshaft, these bearings being part of independent oscillating cradles supported on blades. Vibration sensors register the shifts sustained by the oscillating bearings and furnish this data to analog-digital computers 4 which determine the corrections to be made by removal of material from the two terminal counterweights of the crankshaft.

In addition, as stated precedingly, an imaginary representation of the connecting-rod/piston compound is provided by the presence of a weight 11 fixed at a preset angle to a plate 12 equipped with a crankshaft driving peg. At the other end, a weight 13 is secured to the shaft to represent the second axial component of the want of balance in the moving compound.

The machine comprises members for positioning these weights in relation to the machine driving shaft, both angularly and distance-wise.

These members are schematically represented by actuating arms 14, 15 operating on the weights, and by a pusher 16 for adjusting the angular position of the crankshaft relatively to the drive plate 12.

The crankshaft is then conveyed along the transfer path to the machining station 5, where the correction is effected by milling the terminal counterweights along two mutually perpendicular planes. As is clearly shown in FIGURE 1, in which the tools are diagrammatically represented by reference numeral 6, the direction of milling is parallel to the axis of the part, whereby the four milling units 6a, 6b, 6c, 6d can be used to effect the overall correction determined by the computer. Thus, each of the two millers cuts a peripheral notch 7a (and 7b) into each counterweight involved in the correction, and these notches are made parallel to the crankshaft axis, i.e. perpendicular to the plane of the counterweight, the depth $a$ of each notch being determined by the computer and the two notches cut into a given counterweight being contained in axial planes which are here chosen perpendicular to each other.

The crankshaft is then led before a testing machine 8 identical to the measuring machine 3, which checks that the final want of balance lies within the allowable tolerances.

In cases where the initial want of balance may be greater than a certain magnitude, it may be of advantage, as shown in FIGURE 1, to provide for a roughing operation performed by a first set of machines, whereby the want of balance can be reduced to approximately 30% of its initial value. In such cases, the machine according to the invention will consist of two groups, each including a measuring balancer, a set of milling units and a testing balancer, with the testing balancer 8 of the first group serving as a measuring balancer for the second group, while the final testing balancer 10, positioned after the milling units 9a, 9b, 9c, 9d of the second group, discriminates between crankshafts to be dispatched to storage and those to be rejected either because they cannot be corrected or because they require a slight final correction.

The invention has been described in this example with reference to milling machines. However, the removal of material can also be effected by other methods, and particularly by drilling.

What is claimed is:

1. An improved engine crankshaft balancing installation, comprising, positioned along a crankshaft transfer path, a want-of-balance measuring machine and cutting machines effecting the necessary correction by milling the counterweights responsively to data received from computers operating on the basis of information furnished by said measuring machine, characterized in that the crankshafts are translated along the transfer path in a direction perpendicular to their longitudinal axis and in that the correction is effected by milling or cutting only the terminal counterweights in a direction parallel to the crankshaft axis, two cutting units being provided for each counterweight and being arranged in such manner that the cutting be effected in two mutually perpendicular axial planes whereby to remove material from the periphery of the counterweight.

2. A crankshaft balancing installation according to claim 1, wherein said want-of-balance measuring machines comprise weights adapted to be set at suitable angles and at suitable distances from the drive shaft, whereby to provide a representation of the want of balance in the coupled connecting rods that is sustained by the crankshaft in operation.

No references cited.

WILLIAM W. DYER, JR., *Primary Examiner.*

G. A. DOST, *Assistant Examiner.*